Sept. 12, 1950
B. R. SHEPARD
2,522,239
VISUAL ALIGNMENT SIGNAL GENERATOR
Filed Aug. 8, 1946
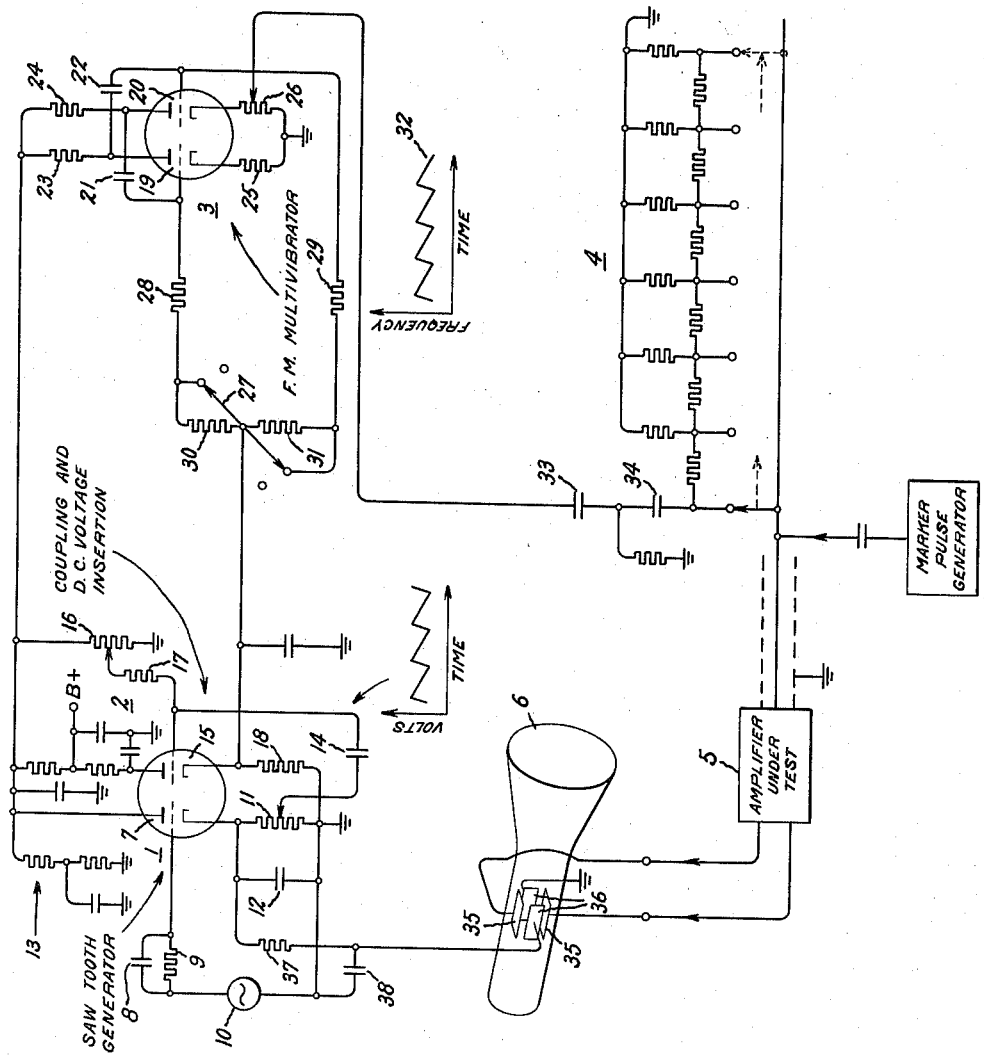
Inventor:
Billy R. Shepard,
by Merton D Mone
His Attorney.

Patented Sept. 12, 1950

2,522,239

UNITED STATES PATENT OFFICE 2,522,239

VISUAL ALIGNMENT SIGNAL GENERATOR

Billy R. Shepard, Schenectady, N. Y., assignor to General Electric Company, a corporation of New York Application August 8, 1946, Serial No. 689,113

1 Claim. (Cl. 250—36)

My invention relates to a visual alignment signal generator for testing or aligning the circuits of amplifiers, transmission systems or the like.

An object of the invention is to provide an improved signal generator of simple construction for producing a varying frequency, or frequency modulated, test signal for use in a visual alignment system.

An additional object of the invention is to provide a stable generator of frequency modulated test signals using a minimum number of inexpensive components wherein the test signal is generated by a high frequency oscillator of a positively-biased multivibrator type which is controlled to provide signals of readily adjustable characteristics.

The novel features which I believe to be characteristic of my invention are set forth with particularity in the appended claim. My invention itself, however, both as to its organization and method of operation, together with further objects and advantages thereof may best be understood by reference to the following description taken in connection with the accompanying drawing wherein the figure is a circuit diagram of a visual alignment signal generator and associated apparatus with which it is adapted to be used.

Referring now to the drawing, the signal generator shown comprises a saw-tooth wave generator 1 connected to a direct current voltage insertion and coupling circuit 2, which is arranged to provide a saw-tooth wave with an adjustable direct current voltage component to the control electrode circuits of a multivibrator high frequency oscillator 3. The output of the multivibrator may be connected to a standard attenuator circuit 4, for intensity adjustments, and then fed to the apparatus to be tested, indicated at 5, which may be an amplifier, transmission system or any other device of which the frequency transmission or frequency response characteristics are to be determined. The output signal from the device under test is arranged to control the beam deflection in one direction in an oscillograph 6, the deflection in the direction perpendicular thereto being controlled by a saw-tooth wave sweep signal from generator 1. It will be understood that the attenuator 4, amplifier 5 and oscillograph 6 form no part of my invention except insofar as they constitute a part of a visual alignment system of a type in which the signal generator of this invention is adapted for use.

Saw-tooth wave generator 1 comprises a triode electron tube 7 with a control electrode leak circuit comprising leak condenser 8 and parallel connected resistor 9 in series in the control electrode connection to one terminal of voltage source 10. This source provides a voltage with a recurring positive voltage peak and may be conveniently a 60 cycle sine wave source. A saw-tooth wave of the same frequency as that of source 10 will be generated in the cathode load circuit of tube 7. Potentiometer resistor 11 is connected from the cathode of tube 7 to a point of reference potential, such as the ground connection shown in the drawing, and is by-passed by storage condenser 12. The anode is provided with a positive operating potential through a suitable filter 13 from a power supply (not shown). Positive voltage peaks from source 10 cause control electrode current to flow in tube 7 to develop a rectified biasing potential across resistor 9, which is stored by condenser 8. Anode current and control electrode current will flow during short periods for each positive voltage peak from source 10, and these currents combine in the cathode resistor 11 to develop a voltage on storage condenser 12. The values of supply voltages and circuit components are such that the potential across condenser 12 will rapidly increase with tube conduction and slowly decrease between conducting periods, providing a saw-tooth wave shape across condenser 12 and accordingly across resistor 11.

An adjustable portion of the saw-tooth wave is taken off by the slider on potentiometer resistor 11 and is applied through condenser 14 to the control electrode of electron tube 15. The saw-tooth wave generator above described is further described and claimed in the copending application of Don M. Jacob, Serial No. 689,110, entitled "Saw-Tooth Wave Generator," filed of even date herewith.

Tube 15 is connected in a cathode follower circuit wherein the cathode potential closely follows the potential applied to the control electrode. A direct current biasing potential for the control electrode is provided by an adjustable slider contacting a point on potentiometer resistor 16, which is across a portion of the positive anode potential supply. Resistance 17 is provided between the control electrode of tube 15 and the potentiometer slider to block substantial alternating current flow to prevent a substantial portion of the saw-tooth wave from leaking off to ground through potentiometer resistance 16. The potential produced on the cathode of the tube 15 by current flow through cathode resistor 18 will contain the saw-tooth wave component as well as a direct current component established by the position of the slider of the potentiometer 16.

The direct current potential appearing on the cathode is utilized to determine the frequency of a multivibrator 3 of the type disclosed in the patent to Bartelink, 2,338,395, assigned to the assignee of the present invention. As shown in the drawing, multivibrator 3 comprises a pair of cross-coupled triode electron tubes 19 and 20 with the anode of tube 20 coupled to the control electrode of tube 19 through capacitor 21 and the anode of tube 19 coupled to the control electrode of tube 20 through a capacitor 22. Anode load resistances 23 and 24 are provided for the anodes of tubes 19 and 20 respectively and the cathodes are provided with un-bypassed individual resistors 25 and 26 respectively. The sawtooth wave with the direct current component appearing on the cathode of tube 15 is furnished through switching means 27 and series resistors 28 and 29 respectively to the control electrodes of tubes 19 and 20. Associated with switching means 27 are additional resistors 30 and 31 which may be short circuited by the switch in the position shown in the drawing, or inserted in series in the respective control electrode connections of the multivibrator by rotating the switch to its other position. The control electrode circuit time constant may be changed by insertion or removal of resistors 30 and 31 to provide two operating frequency ranges. The frequency of the multivibrator is directly dependent upon the positive potential to which the control electrodes are biased. As shown in Fig. 4 of the above identified patent to Bartelink, the multivibrator frequency corresponding to zero bias of the control electrode may be increased by a factor of approximately 3 by causing the biasing potential to approach the anode potential. Accordingly the frequency produced by the multivibrator will increase and decrease substantially linearly with the variation in the positive bias caused by the imposition of the saw-tooth wave on top of the direct current bias provided across cathode resistor 18 as selected by the position of the slider on potentiometer resistor 16. Curve 32 indicates the variation in frequency of the multivibrator output plotted against time. The multivibrator output is conveniently supplied through coupling condenser 33 and 34 to a network of resistors comprising a standard attenuator 4 of a well-known type. The signal furnished from the attenuator is supplied to the amplifier or transmission system under test 5, the output of which may be supplied to vertical deflection plates 35 of cathode ray oscillograph 6. Horizontal deflection of the oscillograph beam is obtained with plates 36, which are excited from the cathode of the saw-tooth wave generator tube 7 through a suitable coupling system such as resistor 37 and condenser 38.

The frequency modulated test signal is thus obtained by shifting the frequency of the high frequency generator, multivibrator 3, directly, without the necessity of a beat frequency oscillator or other high frequency device, and the oscillator is controlled through a readily adjustable and simple device for developing a sawtooth wave with a direct current component added.

The term "high frequency" is used herein to describe the frequency generated by the multivibrator as distinguished from the lower frequency of the saw-tooth wave generated by generator 1. The term "high frequency" as used herein is accordingly intended to cover not only radio frequencies but lower frequencies as well, such as those in the audible range.

While I have described only certain preferred embodiments of my invention by way of illustration, many further modifications will occur to those skilled in the art and I, therefore, wish to make it understood that I intend in the appended claim to cover all such modifications as fall within the true spirit and scope of my invention.

What I claim as new and desire to secure by Letters Patent of the United States is:

In a system for generating a high frequency sawtooth wave having an adjustable average frequency and having an instantaneous frequency modulated about said average frequency in accord with a sawtooth wave, the combination of a pair of electron discharge devices each having a grid electrode, anode electrode, and cathode, cross coupled to act as a multivibrator operating at a frequency determined by the potential between one of said cathodes and one of the other of said electrodes, another electron discharge device having an anode, a cathode and control electrode, a source of operating potential having a negative terminal connected to said last cathode through a load resistor, and a positive terminal connected to said anode, means for adjustably biasing said control electrode to control the level of direct current through said resistor, means to supply a sawtooth wave between said control electrode and said negative terminal whereby said sawtooth wave is reproduced on said load resistor superposed on a unidirectional potential due to said direct current in said resistor, and means to supply both the reproduced sawtooth potential and unidirectional potential on said resistor between said one cathode and one electrode of said multivibrator to control respectively the instantaneous and average frequency thereof.

BILLY R. SHEPARD.

REFERENCES CITED

The following references are of record in the file of this patent:

UNITED STATES PATENTS

| Number | Name | Date |
|---|---|---|
| 2,168,403 | Geiger | Aug. 8, 1939 |
| 2,226,459 | Bingley | Dec. 24, 1940 |
| 2,338,395 | Bartelink | Jan. 4, 1944 |